United States Patent [19]
Ogino et al.

[11] Patent Number: 5,866,387
[45] Date of Patent: Feb. 2, 1999

[54] METHOD FOR IMMOBILIZING LIGAND OR COMPOUND HAVING LIGAND BONDED THERETO

[75] Inventors: Eiji Ogino; Kazuo Suzuki, both of Kobe; Nobutaka Tani, Osaka, all of Japan

[73] Assignee: Kanegafuchi Kagaku Kogyo Kabushiki Kaisha, Osaka, Japan

[21] Appl. No.: 894,782

[22] PCT Filed: Feb. 26, 1996

[86] PCT No.: PCT/JP96/00450

§ 371 Date: Aug. 28, 1997

§ 102(e) Date: Aug. 28, 1997

[87] PCT Pub. No.: WO96/26786

PCT Pub. Date: Jun. 9, 1996

[30] Foreign Application Priority Data

Mar. 1, 1995 [JP] Japan .................................. 7-041910

[51] Int. Cl.[6] .......................... C12N 11/04; C12N 11/06; C12N 11/08; G01N 33/544
[52] U.S. Cl. .......................... 435/179; 435/180; 435/181; 436/530; 436/531; 436/532; 436/533; 436/534; 530/324; 530/328; 530/814; 530/815; 530/816; 536/30; 536/56; 536/92
[58] Field of Search ..................... 435/179, 180, 435/181; 436/530, 531, 532, 533, 534; 530/324, 328, 814, 815, 816; 536/30, 56, 92

[56] References Cited

FOREIGN PATENT DOCUMENTS 48-66084 A   9/1973   Japan .
49-117593 A   11/1974   Japan .

OTHER PUBLICATIONS

"Immobilization of Biocatalyst", Atsuo Tanaka et al., Gendai Kagaku pp. 24–30, Jul., 1992 (and translation–in–part thereof).

"Thiazolidine Chemistry. III. The Preparation and Reduction of Some 2–Phenyl–3–n–alkyl–4–thiazolidinones", Irving Schmolka et al., J. Am. Chem. Soc., vol. 79, pp. 4716–4720, Sep., 1957.

"Peptide segment ligation strategy without use of protecting groups", Chuan–Fa Liu et al., Proc. Natl. Acad. Sci. USA, vol. 91, No. 6584–6588, Jul., 1994.

"Synthesis of Peptide Dendrimer", Chang Rao et al., J. Am. Chem. Soc. vol. 116, No. 15 pp. 6975–6976, 1994.

*Primary Examiner*—Peter O'Sullivan
*Attorney, Agent, or Firm*—Kubovcik & Kubovcik

[57] ABSTRACT

There is provided a method for immobilizing a ligand by reacting a solvent-insoluble carrier having aldehyde group with a compound shown by the general formula:

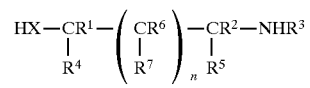

wherein X is —S— or —O—, $R^1$, $R^2$ and $R^6$ are the same or different, each of which is hydrogen atom or an alkyl group having 1 to 4 carbon atoms, $R^3$ is hydrogen atom or a substituent wherein an atom adjacent to nitrogen atom shown in the above-mentioned general formula has no unsaturated bond, $R^4$, $R^5$ and $R^7$ are arbitrary substituents; provided that only one partial chemical structure of HX—C—C—$NHR^3$ wherein X and $R^3$ are the same as defined above or HX—C—C—$NHR^3$ wherein X and $R^3$ are the same as defined above is contained in one compound described above by which, a ligand or a compound to which a ligand is bonded can react specifically and effectively with aldehyde group in a solvent-insoluble carrier at a prescribed position to form a stable bond.

4 Claims, No Drawings

METHOD FOR IMMOBILIZING LIGAND OR COMPOUND HAVING LIGAND BONDED THERETO

TECHNICAL FIELD

The present invention relates to a method for immobilizing a ligand or a compound having a ligand bonded thereto onto a solvent-insoluble carrier having aldehyde groups.

BACKGROUND ART

Methods for immobilizing a ligand onto a carrier have been studied in large numbers for researches in an immobilized enzyme, and the like, and also industrially utilized for producing an adsorbent and the like. Representative examples of the methods are the following methods:

(1) a method for generating an imido carbonate by a cyanogen bromide activating method and successively reacting it with an amino group of a ligand, (2) a method known as an acid azide derivative method, which comprises esterifing a carboxyl group on a carrier, converting the resulting ester into a hydrazide, successively converting the resulting hydrazide into an azide, and finally replacing the resulting azide group with an amino group of a ligand, (3) a method known as a diazo method, which comprises generating a diazonium salt on a carrier and making it react with an amino group of a ligand, (4) a method known as a condensing reagent method, which comprises condensing an amino group or carboxyl group on a carrier with a carboxyl group or amino group of a ligand with a condensing reagent, (5) a method known as an alkylating method, which comprises introducing an acetyl bromide group or 4,6-dichloro-s-triazinyl group onto a carrier and making it react with an amino group of a ligand, (6) a method known as a carrier-crosslinking method, which comprises crosslinking an amino group on a carrier and an amino group of a ligand with glutaraldehyde and reducing the resulting compound, and the like (Atsuo Tanaka, Takuo Kawamoto, Gendai Kagaku, pp. 24–30, July 1992). A method for immobilizing a ligand onto a solvent-insoluble carrier having an aldehyde group is based on the method (6) mentioned above. And this method comprises reacting a ligand having an amino group to generate a Schiff base and successively reducing it (a reductive amination).

Outlines of the above-mentioned immobilizing methods (1)–(6) are shown by the following reaction formulas. In the following chemical reaction formulas, Z is a carrier and E is an enzyme.

Method (1)

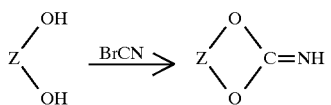

-continued

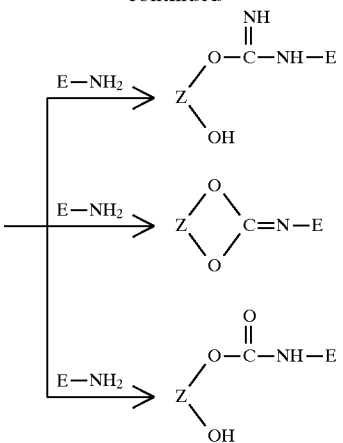

Method (2)

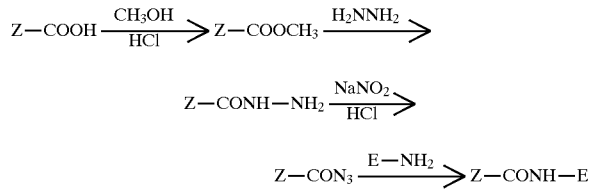

Method (3)

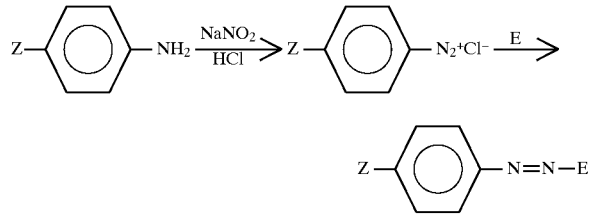

Method (4)

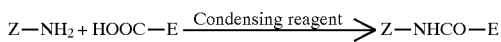

or

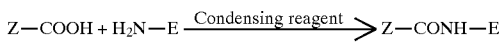

Method (5)

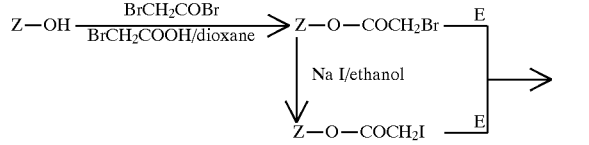

$$Z-O-COCH_2-E$$

or

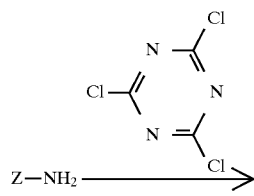

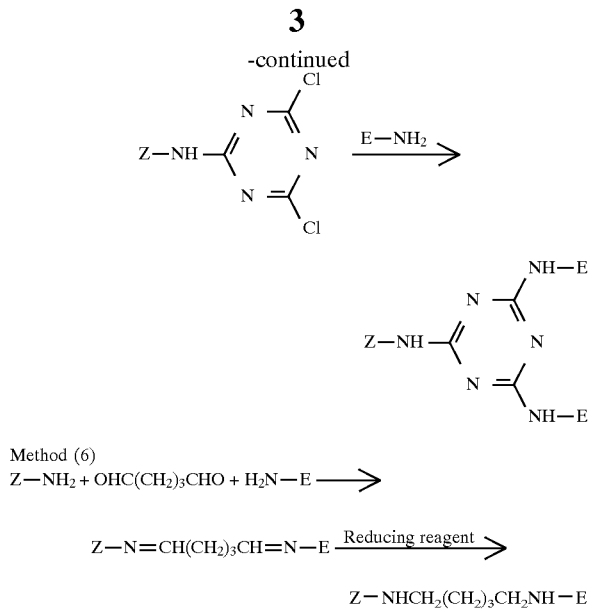

-continued

Method (6)
Z—NH$_2$ + OHC(CH$_2$)$_3$CHO + H$_2$N—E ⟶

Z—N=CH(CH$_2$)$_3$CH=N—E $\xrightarrow{\text{Reducing reagent}}$

Z—NHCH$_2$(CH$_2$)$_3$CH$_2$NH—E

However, these methods have the following defects.

(a) In case there are plural functional groups to be used for immobilization in a ligand, it is extremely difficult to immobilize the ligand with a functional group existing at a prescribed position of the ligand, because there are plural immobilization points. Furthermore, it is not preferable that there are many functional groups in a ligand, because the possibility that many bonds are formed at many points in the ligand becomes high. Also, in case the number of functional groups in the above-mentioned ligand is reduced in order to avoid forming bonds at multi-points, a reaction yield becomes low. The methods corresponding to these are the above-mentioned methods (1), (2), (3), (4), (5) and (6).

(b) There are many competitive side reactions, and a reaction yield is low. The methods corresponding to these, are the above-mentioned methods (2), (3), (4) and (5).

In other words, these methods have considerable limits in immobilizing a ligand at a prescribed position thereof onto a solvent-insoluble carrier. Especially in case a peptide or protein is used as a ligand, it is impossible to immobilize a ligand with a prescribed amino group onto the carrier, because a peptide or protein often has amino groups in a side chain (in other words, there exist plural amino groups in one molecule).

On the other hand, it has been known as a reaction of organic synthesis chemistry for a long time that a thiazolidine structure is formed when an aldehyde compound and a derivative of aminoethanethiol (HSCH$_2$CH$_2$NH$_2$) are reacted in the presence of an acidic or basic catalyst in an aqueous solution (Schmolka IR, J. Amer. Chem. Soc., 79, p.4716(1957). In late years, this classical reaction has been studied for applying it to bond formation between peptides, and it has been reported recently that peptides can be bonded each other efficiently by this reaction (C. F. Liu, J. P. Tam, Proc. Natl. Acad. Sci. USA, 91, p.6584(1994), C. Rao and J. P. Tam, J. Am. Chem. Soc.), 116, p.6975(1994)).

This method introduces an aldehyde group into the C-terminus of one of two kinds of peptides and has it react with the other peptide (N-terminal cysteine), and the reaction is performed in an aqueous solution wherein both reactants are dissolved in water. In other words, it can be said that such a reaction is known as a reaction only in a uniform solution.

Generally, a reaction between a solid phase and a liquid phase is extremely difficult to proceed. For example, when a dehydration condensation is performed between a terminal amino group (—NH$_2$) of a hydrophilic compound M having an amino group, for example, a peptide, an amino acid, a protein or a derivative thereof, and a terminal carboxyl group (—COOH) of a hydrophilic compound N having a carboxyl group, for example, a peptide, an amino acid, a protein or a derivative thereof, using DCC (dicyclohexylcarbodiimide), the fact is well-known that a reaction between a carboxyl group of the compound N and DCC does not proceed and a dehydration condensation does not occur, because DCC is insoluble in water (DCC exists as a solid) in an aqueous solution. In other words, it seems quite difficult to apply the above-mentioned reaction reported by C. F. Liu et al. and by C. Rao et al. to a reaction between a solid phase and a liquid phase. As a matter of fact, there are still no example that the above-mentioned reaction is applied to a two-phase reaction of solid-liquid phases.

An adsorbent is widely used in fields such as experimentation, industry, medical treatment and diagnosis purposes of analysis, separation, purification and removal. Fundamental components of an adsorbent consist of a so-called carrier, which is a solid insoluble in an elution solvent, and a so-called ligand, which is a compound having a high affinity for an objected substance.

A method, by which a ligand is immobilized specifically at a prescribed position of a ligand with a high reaction efficiency to form a stable bond, is now eagerly demanded as a method for immobilizing a ligand onto a solvent-insoluble carrier. However, there is not such a method at present. After the present inventors knew well the high degree of difficulty and the strong demand as to establishment of such a method, they started tackling this problem.

Therefore, an object of the present invention is to provide a method for immobilizing a ligand or a compound having a ligand bonded thereto onto a solvent-insoluble carrier, which comprises efficiently and specifically reacting the ligand or the compound with the carrier at a prescribed position to form a stable bond to the carrier.

DISCLOSURE OF THE INVENTION

The present invention relates to a method for immobilizing a compound onto a solvent-insoluble carrier having an aldehyde group, which comprises reacting said carrier with said compound, said compound being shown by the general formula (I):

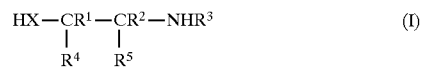

wherein X is —S— or —O—, R$^1$ and R$^2$ are the same or different, each of which is hydrogen or an alkyl group having 1 to 4 carbon atoms, R$^3$ is hydrogen or a substituent wherein an atom adjacent to nitrogen shown in the general formula (I) has no unsaturated bond, R$^4$ and R$^5$ are arbitrary substituents, provided that only one partial chemical structure of HX—C—C—NHR$^3$ wherein X and R$^3$ are the same as defined above or HX—C—C—C—NHR$^3$ wherein X and R$^3$ are the same as defined above is contained in one compound, or the general formula (II):

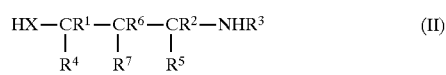

wherein X is —S— or —O—, R$^1$, R$^2$ and R$^6$ are the same or different, each of which is hydrogen or an alkyl group having 1 to 4 carbon atoms, $R^3$ is hydrogen or a substituent wherein an atom adjacent to nitrogen shown in the general formula (II) has no unsaturated bond, $R^4$, $R^5$ and $R^7$ are arbitrary substituents, provided that only one partial chemical structure of HX—C—C—NHR$^3$ wherein X and $R^3$ are the same as defined above or HX—C—C—C—NHR$^3$ wherein X and $R^3$ are the same as defined above is contained in one compound (Claims 1); the method wherein a reaction for immobilization uses conditions satisfying the following:

$$0 < b/a \leq 100$$

and $$1/1000 \leq A \leq 10000,$$

when A ($\mu$ mol/g) is the density of aldehyde group of said solvent-insoluble carrier, a($\mu$ mol) is the amount of aldehyde group in an immobilizing reaction system, and b($\mu$ mol) is the amount of the compound shown by the general formula (I) or (II) in the system, the method wherein a solvent-insoluble carrier used as said solvent-insoluble carrier is obtained by introducing epoxy group into a solvent-insoluble carrier which has no aldehyde group, ring-opening said epoxy group with ammonia or an amine, and then forming an aldehyde group therefrom through an oxidative reaction, and the method wherein, after immobilizing said compound onto said carrier, treatment is performed under conditions satisfying the following:

$$t \geq -10 \times h + 120 \ (250 \geq t \geq 20),$$

when t(°C) is the treatment temperature and h(hour) is the treatment time.

BEST MODE FOR CARRYING OUT THE INVENTION

In the present invention, when a solvent-insoluble carrier having an aldehyde group reacts with the above-mentioned compound having SH or OH and an amino group (NH) shown by the general formula (I) or (II), a ligand is immobilized by utilizing that the aldehyde group of the carrier reacts specifically with the SH or OH group and an amino group in the compound shown by the general formula (I) or (II) to form a stable bond.

The solvent-insoluble carrier in the present invention means a carrier which does not dissolve in a used solvent during a reaction and an application, and concrete examples of the solvent are for instance, water, alcohol, DMSO, DMF, NMP (N-methyl pyrrolidone), dioxane, acetone, THF (tetrahydrofuran) and the like.

Further, a buffer solution obtained by adding acetic acid, sodium acetate, citric acid, sodium citrate, phosphoric acid, sodium phosphate, boric acid, sodium borate, sodium chloride, KCl or the like to water may be used as a solvent. These solvents may be used alone or in an admixture of two or more kinds of the solvents. Concrete examples of the solvent-insoluble carrier when water or an aqueous solvent containing water is used as a solvent, that is, concrete examples of the water insoluble-carrier are, an inorganic carrier such as glass beads or silica gel, a water-insoluble carrier comprising synthetic polymer such as crosslinked-polyvinyl alcohol, crosslinked-polyacrylate, crosslinked-polyacrylamide, crosslinked-polystyrene, polyvinyl alcohol, saponificated ethylene-vinyl acetate copolymer, polyacrylamide, polyacrylic acid, polymethacrylic acid, polymethyl methacrylate, polyacrylic acid-grafted polyethylene or polyacrylamide-grafted polyethylene, an organic carrier comprising a polysaccharide such as crystalline cellulose, crosslinked-cellulose, crosslinked-agarose, crosslinked-dextran or chitosan, and a composite carrier obtained by a combination of the above-mentioned carriers such as an organic—organic carrier or an organic-inorganic carrier. These carriers may be used alone or in an admixture of two or more kinds thereof may be used. Among them, a hydrophilic carrier is preferable because non-specific adsorption is comparatively small and selective adsorption by a ligand is good.

The above-mentioned hydrophilic carrier means a carrier having a contact angle of at most 60 degrees with water. The contact angle is that of a compound constituting the carrier which is made to be in the form of a flat plate. Representative examples of such a hydrophilic carrier are, for instance, carriers comprising a polysaccharide such as crystalline cellulose, crosslinked-cellulose, chitosan crosslinked-agarose or crosslinked-dextran; polyvinyl alcohol, saponified ethylene-vinyl acetate copolymer, polyacrylamide, polyacrylic acid, polymethacrylic acid, polyacrylic acid-grafted polyethylene, polyacrylamide-grafted polyethylene, glass and/or the like.

Among these hydrophilic carriers, a carrier having OH group is superior in the point that non-specific adsorption is small. Especially, a porous gel comprising crystalline cellulose or crosslinked-cellulose is the most preferable one for the carrier used in the present invention because of such superior points as follows;

(1) the carrier of the porous gel is hardly destroyed or generates finely divided particles by the operation of stirring, and the like because of a relatively high mechanical strength and toughness. Since the carrier is neither compacted nor clogged up when a column is charged therewith and a liquid is passed through the column at a high flow rate, a liquid can be passed through the column at a high flow rate. Further, the pore structure hardly changes by high-pressure steam sterilization;

(2) the carrier is hydrophilic since the gel is constituted by crystalline cellulose or crosslinked-cellulose. There exist many OH groups available for bonding a ligand, and non-specific adsorption is also a little;

(3) the gel has relatively high strength, even if volume of porosity thereof is enlarged. Thus, capacity of adsorption thereof which is not inferior to that of a soft gel is obtained; and the like.

However, the carrier used in the present invention is not limited only thereto.

The solvent-insoluble carrier having an aldehyde group used in the present invention may be obtained by introducing an aldehyde group into a solvent-insoluble carrier. Various methods for introducing an aldehyde group into a solvent-insoluble carrier have been studied until now. Any method for introduction can be used for the present invention. Hereinafter, as an example, a method for introducing an aldehyde group into a carrier made from cellulose used as a raw material will be mentioned.

Examples of the most simple methods for introducing aldehyde group are (i) a method wherein an aldehyde group is introduced by reacting a cellulose carrier with sodium periodate to oxidatively cleave a glucose ring; (ii) a method wherein an aldehyde group is introduced by reacting a hydroxyl group of a cellulose carrier with epichlorohydrin to introduce an epoxy group thereinto, reacting the thus introduced epoxy group with an amine (e.g. $NH_3$, ethylenediamine or the like) to introduce an amino group thereinto, and reacting the thus introduced amino group with glutaraldehyde to introduce an aldehyde group thereinto through a reductive amination; and the like. The present inventors have developed a method (iii), which was obtained by improving the above methods (i) and (ii). In the method (iii), after introducing an amino group by the method (ii), 1 to 5 equivalents of an oxidizer such as sodium periodate to one equivalent of the amino group is reacted with amino group. The present inventors preferably use this method for the following reasons.

That is, the methods (ii) and (iii) are superior to the method (i) in the point that there does not arise the side reaction of a reaction for immobilizing a ligand wherein a ligand is immobilized with even amino group in a side chain. Further, the method (iii) is superior to the method (ii) in the points that reaction conditions are mild and that the reaction can be simply performed in a short time. The characteristic of the method (iii) is that aldehyde group is introduced by oxidizing a terminal functional group:

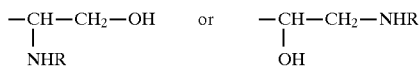

wherein R is hydrogen or an alkyl group having an arbitrary number of carbon atom, usually 1 to 4 carbon atoms (concretely, methyl, ethyl, propyl, butyl or aminoethyl ($-CH_2CH_2-NH_2$) group, or the like), a preferable R is hydrogen from the viewpoints of reaction operation and reactivity. This reaction proceeds quantitatively and is completed in a short time, about 5 minutes.

An outline of the method (iii) will be shown below using the following chemical reaction formula.

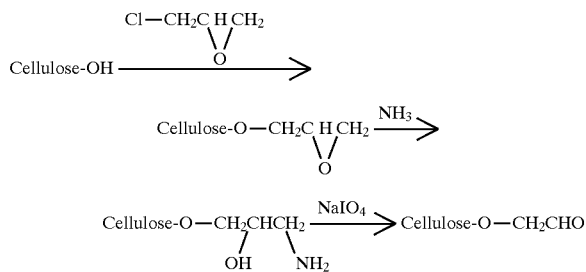

In the present invention, the compound to be reacted with an aldehyde group introduced into a solvent-insoluble carrier may be a compound having a prescribed chemical structure known as a compound shown by the general formula (I):

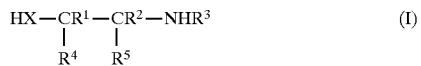

wherein X is —S— or —O—, $R^1$ and $R^2$ are the same or different, each of which is hydrogen or an alkyl group having 1 to 4 carbon atoms, $R^3$ is hydrogen or a substituent wherein an atom adjacent to nitrogen shown in the general formula (I), that is, an atom bonded to the above-mentioned nitrogen atom has no unsaturated bond, $R^4$ and $R^5$ are arbitrary substituents, provided that only one partial chemical structure of $HX-C-C-NHR^3$ wherein X and $R^3$ are the same as defined above or $HX-C-C-C-NHR^3$ wherein X and $R^3$ are the same as defined above is contained in one compound, or the general formula (II):

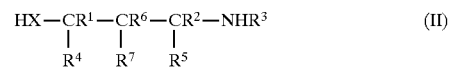

wherein X is —S— or —O—, $R^1$, $R^2$ and $R^6$ are the same or different, each of which is hydrogen or an alkyl group having 1 to 4 carbon atoms, $R^3$ is hydrogen or a substituent wherein an atom adjacent to nitrogen shown in the general formula (II) has no unsaturated bond, $R^4$, $R^5$ and $R^7$ are arbitrary substituents, provided that only one partial chemical structure of $HX-C-C-NHR^3$ wherein X and $R^3$ are the same as defined above or $HX-C-C-C-NHR^3$ wherein X and $R^3$ are the same as defined above is contained in one compound. XH and an amino group in the general formula (I) or the general formula (II) can be reaction points and region specifically immobilize a ligand onto a carrier by reacting with aldehyde group on a carrier.

X in the general formula (I) and the general formula (II) is —S— or —O—. When X is one of these groups, it is preferable from the viewpoints of reactivity in an immobilizing reaction and stability of a bond.

$R^1$, $R^2$ and $R^6$ in the general formula (I) or (II) are as mentioned above, each of which is hydrogen or an alkyl group having 1 to 4 carbon atoms (for example, in the same manner as in case of the above-mentioned R, the alkyl group is methyl, ethyl, n-propyl, n-butyl, iso- propyl or iso-butyl group, or the like). However, it is preferable that $R^1$ is hydrogen or methyl, $R^2$ is hydrogen or methyl and $R^6$ is hydrogen or methyl from the viewpoint of steric hindrance during a reaction.

A peptide or protein of which N-terminus is cysteine, threonine or serine has the above-mentioned prescribed chemical structure.

In a single-chain peptide or protein of which the N-terminus is cysteine, threonine or serine, even if cysteine, threonine or serine is contained in a site other than the N-terminus, it does not give the above-mentioned prescribed chemical structure, and only amino acid residue at N-terminus reacts with an aldehyde group on a carrier.

The most straightforward example is the case where only lysine at the N-terminus of polylysine is substituted for cysteine, threonine or serine. In this case it is impossible to immobilize the substituted polylysine at the N-terminus by any one of the methods (1)–(6) described in Background art. However, it becomes possible to immobilize it at the N-terminus when the method of the present invention is used wherein aldehyde group has been introduced into the carrier.

Needless to say, when a compound used as a ligand is a peptide or protein, it is also possible to give regiospecificity by separately introducing the above-mentioned prescribed chemical structure thereinto. This method is also effective in immobilization of a ligand other than a peptide or protein. This method is particularly effective in immobilizing a compound having a nucleophilic functional group such as amino, thiol or hydroxyl group in a side chain.

The reason is that in case of immobilizing a compound having a nucleophilic functional group such as amino, thiol or hydroxyl group in a side chain, it is difficult to immobilize the compound at a prescribed position (of a ligand) using a usually well-known immobilizing method, i.e., an immobilizing method by reacting the compound with an epoxy-activated carrier or a CNBr-activated carrier (even if it is going to immobilize the compound with a terminal functional group, an immobilizing reaction occurs also in a functional group in a side chain). By contrast, in the immobilizing method of the present invention, even if the above-mentioned functional group is contained in a side chain, the immobilization in a side chain does not occur, and direction of a ligand can be put in order. An example of the reaction between the above-mentioned carrier and the compound shown by the general formula (I) or (II) according to the present invention is shown below.

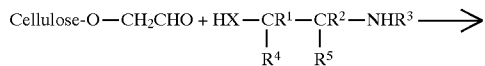

(Compound shown by the general formula (I))

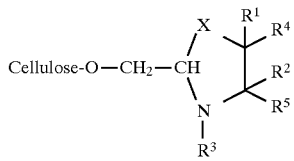

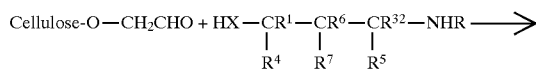

(Compound shown by the general formula (II))

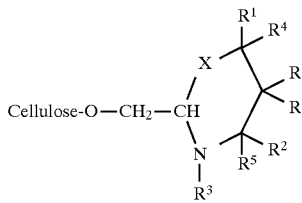

The term "ligand" in this specification means a ligand which has a high affinity for an objected substance and can be utilized as an adsorbent by immobilizing it onto a carrier.

Accordingly, when the compound has a prescribed structure given by removing $R^4$ and $R^5$, or $R^4$, $R^5$ and $R^7$ from the compound shown by the general formula (I) or (II), respectively as a part of a ligand, a whole compound in the general formula (I) or (II) becomes a ligand. On the other hand, when at least one of $R^4$ and $R^5$ or at least one of $R^4$, $R^5$ and $R^7$ in the compound shown by the general formula (I) or (II) acts as a ligand and other parts are used for immobilization which merely has regiospecificity; at least one of $R^4$ and $R^5$ or at least one of $R^4$, $R^5$ and $R^7$ in the compound shown by the general formula (I) or (II) becomes a ligand.

In case of using conditions in the reaction wherein the above-mentioned solvent-insoluble carrier having an aldehyde group is reacted with the compound shown by the general formula (I) or (II), which satisfy the following:

$$0 b/a \leq 100$$

and $$1/1000 \leq A \leq 10000,$$

when the density of aldehyde group of the solvent-insoluble carrier is A ($\mu$ mol/g), the amount of aldehyde groups in an immobilizing reaction system is a($\mu$ mol) and the amount of the compound shown by the general formula (I) or (II) in the immobilizing reaction system is b ($\mu$ mol); the compound shown by the general formula (I) or (II) can be the most effectively immobilized. These conditions have been found by the present inventors.

When the above-mentioned b/a is more than 100, it is not economical because an amount of the compound shown by the general formula (I) or (II) increases, which does not react and is recovered. More preferable conditions satisfy the following: $0<b/a \leq 10$, and a decrease of an amount of the immobilized compound is not observed in almost all cases, even if a value of b/a becomes smaller. Still more preferable conditions satisfy the following: $0<b/a \leq 3$, and these conditions are preferable and highly economical in case the compound shown by the general formula (I) or (II) is expensive and the compound shown by the general formula (I) or (II) should be immobilized in a high density. Surprisingly, an immobilizing yield of at least 70% can be obtained, even if a reaction is performed under the conditions of b/a=1 (that is, an equivalent amount of the compound shown by the general formula (I) or (II) to an amount of aldehyde groups is used). Further, $b/a \geq 1/1000$ is preferable from the viewpoint of an immobilizing yield.

On the other hand, when A is smaller than 1/1000, the efficiency for immobilizing the compound shown by the general formula (I) or (II) becomes extremely worse, however high the concentration of the compound shown by the general formula (I) or (II) may increase. In contrast, when A is larger than 10000, the amount of the compound immobilized in practice far exceeds a necessary amount of the compound to be immobilized, and it becomes necessary to cap an excess of aldehyde groups (the activity of aldehyde groups disappears by "sealing" aldehyde group by an appropriate compound). It sometimes occurs that capability of the immobilized compound shown by the general formula (I) or (II) as a ligand is lowered by reason that the used capping reagent greatly influences the compound.

For the above-mentioned reasons, $1/1000 \leq A \leq 10000$ is preferable, and $1/100 \leq A \leq 1000$ is more preferable.

In addition, there are various methods to measure a weight of a carrier in calculating A. A condition may satisfy $1/1000 \leq A \leq 10000$, by the following method. That is, in case of drying a porous gel or the like, there is a method wherein a solvent is sucked and removed from the outside of the gel on a glass filter by suck drying, and water even in the inside of the gel can be completely removed by lyophilization or the like.

On the other hand, in a method for immobilizing the above-mentioned compound onto a solvent-insoluble carrier, a stable bond can be formed by removing an unreacted ligand by washing or the like after the reaction, and then by treating the carrier for at least 10 hours at 20° C. or at least 30 minutes at 115° C. When the treatment temperature is t[°C. ] and the treatment time is h[ hour], these conditions are expressed by the numerical formula:

$$t \geq -10 \times h + 120 \ (250 \geq t \geq 20)$$

When treatment with conditions satisfying the above-mentioned formula is performed, only a stable bond can remain, and an unstable bond can be extremely easily taken off and removed. This treatment is not necessarily required for some kinds of uses, but it is an extremely effective treatment to avoid eliminating a ligand from an adsorbent. The upper limit of the treatment temperature t is about 250° C. from the viewpoint of strength of a bond and more preferably about 150° C., and the lower limit is about 20° C. from the viewpoint of the treatment time.

As a preferable embodiment of the immobilizing method as mentioned above, there is exemplified a method which comprises ring-opening an epoxy group which is introduced into a hydrophilic carrier having a comparatively small non-specific adsorption property and a good selectivity of adsorption by a ligand (a carrier comprising a polysaccharide such as cellulose, agarose, dextran or chitosan, or the like is particularly preferable), by action of ammonia or an amine; inducing a hydroxyl group and a group having amino group in two adjacent carbon atoms, respectively, and then converting the hydroxyl group into an aldehyde group by an oxidative reaction; and reacting the compound shown by the general formula (I) or (II) with an aldehyde group under the conditions satisfying $$1/10 \leq b/a \leq 10,$$

$$1 \leq A < 500$$

wherein A is the density ($\mu$ mol/g) of aldehyde groups of the water-insoluble carrier; a is the amount ($\mu$ mol) of aldehyde groups in the reaction system; b is the amount ($\mu$ mol) of the compound shown by the general formula (I) or (II) in the reaction system. After the reaction, the bond between the carrier and the ligand can be made stable by treating the thus obtained carrier at 80° to 130° C. for about 240 to about 20 minutes.

When a ligand is immobilized by the above-mentioned method, it is possible to prepare a carrier onto which a ligand is immobilized through a stable bond by making a ligand specifically and efficiently react with aldehyde group of a solvent-insoluble carrier at a prescribed position.

Hereinafter, the method of the present invention will be explained by means of the following Examples. However, the present invention is not limited to these Examples.

EXAMPLE 1

After water was added to 90 ml of CKA3 (made by CHISSO CORPORATION which was a porous hard cellulose gel to give 180 ml of a total volume of the resulting mixture, thereto was added 60 ml of 2M sodium hydroxide.

Then, the temperature of the mixture was raised to 40° C. After 21 ml of epichlorohydrin was added thereto, a reaction was performed for one hour at 40° C. with stirring. After the reaction was completed, the resulting reactant was fully washed with water to give a gel into which an epoxy group was introduced.

After 3 ml of 28% aqueous ammonia and 17 ml of water were added to 10 g of thus obtained gel into which at epoxy group was introduced, the mixture was stirred. Then, the mixture was kept at room temperature for 20 hours. The mixture was washed with an enough amount of water to give a gel into which an amino group was introduced (10 $\mu$ mol/g). Successively, thereto was added 25 ml of an aqueous solution of 10 $\mu$ mol/ml of sodium metaperiodate, followed by stirring for five minutes at room temperature. Then, the mixture was washed with an enough amount of water to give a gel into which an aldehyde group was introduced (10 $\mu$ mol/g). An amount of the introduced aldehyde group was determined by adding 100 $\mu$ mol of phenylhydrazine to 1 g of the aldehyde group-introduced gel to give 5 ml of a total volume of the resulting mixture, shaking it for 4 hours at room temperature, and measuring absorbance of phenylhydrazine in a supernatant. As a control, 1 g of a gel (CKA3) into which no aldehyde group was introduced was treated in the same manner as in the above, and absorbance of phenylhydrazine in a supernatant was measured.

Cysteine was dissolved in 50 mM acetic acid-sodium acetate buffer(pH3.0) to give 10 $\mu$ mol/ml of a concentration of cysteine. After 3 g of the above-mentioned gel into which an aldehyde group was introduced was suspended in 3 ml of thus obtained solution, the suspension was stirred at room temperature for 20 hours to give an adsorbent. The concentrations of cysteine in the reaction mixture before and after the reaction were measured. The concentration of cysteine in the reaction mixture after the reaction was 20% of that before the reaction.

COMPARATIVE EXAMPLE 1

Lysine was dissolved in 50 mM acetic acid-sodium acetate buffer(pH3. 0) to give 10 $\mu$ mol/ml of a concentration of lysine. After 3 g of the aldehyde group-introduced gel prepared in Example 1 was suspended in 3 ml of thus obtained solution, the suspension was stirred at room temperature for 20 hours to give an adsorbent. The concentrations of lysine in the reaction mixture before and after the reaction were measured. However, there was no change in the concentrations of lysine before and after the reaction.

EXAMPLE 2

Cysteine was dissolved in 100 mM acetic acid-sodium acetate buffer(pH5.0) to give 20 $\mu$ mol/ml of a concentration of cysteine. After 3 g of the aldehyde group-introduced gel prepared in Example 1 was suspended in 100 ml of the thus obtained solution, the suspension was stirred at room temperature for 20 hours to give an adsorbent. After immobilizing cysteine onto the adsorbent, the adsorbent was heated for ten hours at 100° C. in 1N hydrochloric acid. As the result of a quantitative analysis of eliminated cysteine, an amount of immobilized cysteine was 9.9 $\mu$ mol/g.

The quantitative analysis was performed by adding a saturated aqueous solution of sodium borate containing TNBS (trinitrobenzenesulfonic acid) (1 $\mu$ mol/ml) after pH was adjusted to 8.5–9.0, and measuring an amount of amino group.

EXAMPLE 3

Cysteine was dissolved in a mixture of 50 mM acetic acid-sodium acetate buffer (pH 4.0) and N-methyl pyrrolidone in a ratio of 1:1 (v/v) to give 10 $\mu$ mol/ml of a concentration of cysteine. After 1 g of the aldehyde group-introduced gel prepared in Example 1 was suspended in 3 ml of thus obtained solution, the suspension was stirred at room temperature for 20 hours to give an adsorbent. The concentrations of cysteine in the reaction mixture before and after the reaction were measured. The concentration of cysteine in the reaction mixture after the reaction was 67% of that before the reaction.

EXAMPLE 4

Cysteine was dissolved in 50 mM acetic acid-sodium acetate buffer(pH4.5) to give 5 $\mu$ mol/ml of a concentration of cysteine. After 3 g of the aldehyde group-introduced gel prepared in Example 1 was suspended in 3 ml of thus obtained solution, the suspension was stirred at room temperature for 20 hours to give an adsorbent. The concentrations of cysteine in the reaction mixture before and after the reaction were measured. The concentration of cysteine in the reaction mixture after the reaction was 2% of that before the reaction.

EXAMPLE 5

After 90 ml of CKA3 (made by CHISSO CORPORATION) which was a porous rigid cellulose gel was immersed in ethanol, water was replaced with ethanol. Further, ethanol was replaced with heptane. After 4 g of a 20% aqueous solution of sodium hydroxide, 12 g of heptane and one drop of Tween 20 (made by ICI company) were added to 10 ml of thus obtained gel, the mixture was stirred for two hours at 40° C. Further, after 5 g of epichlorohydrin was added thereto, a reaction was performed for two hours at 40° C. with stirring. After the reaction was completed, the resulting reactant was fully washed with water to give a gel into which an epoxy group was introduced.

After 10 ml of 28% aqueous ammonia and 10 ml of water were added to 10 g of thus obtained gel into which an epoxy group was introduced, the mixture was stirred. Then, the mixture was kept at room temperature for 20 hours. The mixture was washed with an enough amount of water to give a gel into which an amino group was introduced (100 $\mu$ mol/g). Successively, thereto was added 40 ml of an aqueous solution of 40 $\mu$ mol/ml of sodium metaperiodate, followed by stirring for five minutes at room temperature. Then, the mixture was washed with an enough amount of water to give a gel into which an aldehyde groups was introduced (100 $\mu$ mol/g).

Cysteine was dissolved in 50 mM acetic acid-sodium acetate buffer(pH4.5) to give 5 $\mu$ mol/ml of a concentration of cysteine. After 1 g of the above-mentioned gel into which an aldehyde group was introduced was suspended in 10 ml of thus obtained solution, the suspension was stirred at room temperature for 20 hours to give an adsorbent. The concentrations of cysteine in the reaction mixture before and after the reaction were measured. The concentration of cysteine in the reaction mixture after the reaction was 2% of that before the reaction.

EXAMPLE 6

After water was added to 90 ml of CKA3 (made by CHISSO CORPORATION) which was a porous rigid cellulose gel to give 180 ml of a total volume of the mixture, thereto was added 0.6 ml of 2M sodium hydroxide. Then, the temperature of the mixture was raised to 40° C . After 0.2 ml of epichlorohydrin was added thereto, a reaction was performed for one hour at 40° C. with stirring. After the reaction was completed, the resulting reactant was fully washed with water to give a gel into which an epoxy group was introduced.

After 5 ml of 28% aqueous ammonia and 95 ml of water were added to 50 g of thus obtained gel into which an epoxy group was introduced, the mixture was stirred. Then, the mixture was kept at room temperature for 20 hours. The mixture was washed with an enough amount of water to give a gel into which amino group was introduced (0.1 $\mu$mol/g). Successively, thereto was added 50 ml of an aqueous solution of 0.5 $\mu$ mol/ml of sodium metaperiodate, followed by stirring for five minutes at room temperature. Then, the mixture was washed with an enough amount of water to give a gel into which an aldehyde group was introduced (0.1 $\mu$ mol/g).

Cysteine was dissolved in 50 mM acetic acid-sodium acetate buffer(pH4.5) to give 0.1 $\mu$ mol/ml of concentration of cysteine. After 30 g of the above-mentioned gel into which an aldehyde group was introduced was suspended in 15 ml of thus obtained solution, the suspension was stirred at room temperature for 20 hours to give an adsorbent. The concentrations of cysteine in the reaction mixture before and after the reaction were measured. The concentration of cystine in the reaction mixture after the reaction was 10% of that before the reaction.

EXAMPLE 7

A peptide (from N-terminus, Cys-Thr-Lys-Thr-Phe-Thr-Val-Thr-Glu, molecular weight=1029.1) was dissolved in 50 mM acetic acid-sodium acetate buffer (pH3.0) to give 2 mg/ml of a concentration of the peptide. After 0.72 g of the aldehyde group-introduced gel prepared in Example 1 was suspended in 1.4 ml of thus obtained solution, the suspension was stirred at room temperature for 20 hours to give an adsorbent. The concentrations of the peptide in the reaction mixture before and after the reaction were measured. The concentration of the peptide in the reaction mixture after the reaction was 2% of that before the reaction.

EXAMPLE 8

Acetonitrile and water were mixed in the ratio of 1:1 (v/v), and thereto was added

to give 1 $\mu$ mol/ml of a concentration of the compound. After 0.72 g of the aldehyde group-introduced gel prepared in Example 1 was suspended in 1.4 ml of the thus obtained solution, the suspension was stirred at room temperature for 20 hours to give an adsorbent. The concentrations of the compound in the reaction mixture before and after the reaction were measured. The concentration of the compound in the reaction mixture after the reaction was 2% of that before the reaction.

EXAMPLE 9

A peptide (from N-terminus, Ser-(Lys)n-Lys, molecular weight=about 10,000) was dissolved in 100 mM succinic acid-sodium hydroxide buffer (pH 4.0) to give 2 $\mu$ mol/ml of a concentration of the peptide. After 0.72 g of the aldehyde group-introduced gel prepared in Example 1 was suspended in 1.4 ml of thus obtained solution, the suspension was stirred for 40 hours at 37° C. to give an adsorbent. The concentrations of the peptide in the reaction mixture before and after the reaction were measured. The concentration of the peptide in the reaction mixture after the reaction was 50% of that before the reaction.

The amount of aldehyde groups, the amount of the reacted compound shown by the general formula (I) or (II), the ratio thereof and an amount of the immobilized compound shown by the general formula (I) or (II) to 1 g of the carrier in one of Examples 1–9 and Comparative Example 1 are shown in Table 1.

TABLE 1

| No. of Example | Aldehyde group Density A (μ mol/g) | Aldehyde group Amount a (μ mol) | Amount b of the compound shown by the general formula (I) or (II) (μ mol) | Ratio b/a | Amount R of the immobilized compound shown by the general formula (I) or (II) to 1 g of a carrier (μ mol/g) |
|---|---|---|---|---|---|
| 1 | 10 | 30 | 30 | 1 | 8.0 |
| 2 | 10 | 30 | 2000 | 67 | 9.9 |
| 3 | 10 | 10 | 30 | 3 | 9.9 |
| 4 | 10 | 30 | 15 | 0.5 | 4.9 |
| 5 | 100 | 100 | 50 | 0.5 | 49 |
| 6 | 0.1 | 3 | 1.5 | 0.5 | 0.045 |
| 7 | 10 | 7.2 | 2.7 | 0.38 | 3.7 |
| 8 | 10 | 7.2 | 1.4 | 0.19 | 1.9 |
| 9 | 10 | 7.2 | 2.8 | 0.39 | 1.9 |
| Com. Ex.1 | 10 | 30 | 30 | 1 | 0 |

EXAMPLE 10

After 68 mg of the adsorbent prepared in Example 1 was suspended in 400 μl of saline, the suspension was treated for 10 hours at 20° C. and then subjected to liquid-exchange with water. The resulting adsorbent was subjected to suck drying. Further, the dried adsorbent was again suspended in 400 μl of saline, and the suspension was kept for 65 hours at 25° C. The concentration of cysteine in the supernatant was measured. An amount of cysteine which was eliminated from the adsorbent was less than 1% to an amount of the immobilized cysteine.

EXAMPLE 11

After 68 mg of the adsorbent prepared in Example 7 was suspended in 400 μl of phosphate buffer/saline (PBS), the suspension was heated for 30 minutes at 115° C. in a well-closed container and then subjected to liquid-exchange with saline. The resulting adsorbent was subjected to suck drying. The dried adsorbent was again suspended in 400 μl of PBS, and the suspension was kept for 65 hours at 25° C. The concentration of the peptide in the supernatant was measured. An amount of the peptide which was eliminated from the adsorbent was less than 1% of the amount of the immobilized peptide.

EXAMPLE 12

After 68 mg of the adsorbent prepared in Example 9 was suspended in 400 μl of water, the suspension was heated for 8 hours at 50° C. and then subjected to liquid-exchange with saline. The resulting adsorbent was subjected to suck drying. The dried adsorbent was again suspended in 400 μl of water, and the suspension was kept for 65 hours at 25° C. The concentration of the peptide in the supernatant was measured. An amount of the peptide which was eliminated from the adsorbent was less than 1% to an amount of the immobilized peptide. The ratios of the eliminated ligands in Examples 10 to 12 are shown in Table 2.

TABLE 2

| No. of Example | Ratio of eliminated ligand(%) |
|---|---|
| 10 | <1 |
| 11 | <1 |
| 12 | <1 |

INDUSTRIAL APPLICABILITY

The immobilizing method of the present invention is an immobilizing method which is simple, makes a ligand or a compound having a ligand bonded thereto react specifically and effectively with an aldehyde group of a solvent-insoluble carrier at a prescribed position and can form a stable bond. Therefore, the immobilizing method of the present invention is useful for producing an adsorbent, and the like.

We claim:

1. A method for immobilizing a compound onto a solvent-insoluble carrier having an aldehyde group, which comprises reacting said carrier with said compound, said compound being shown by the formula (I):

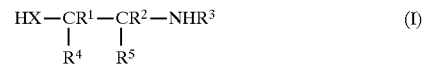
(I)

wherein X is —S— or —O—, $R^1$ and $R^2$ are the same or different, each of which is hydrogen or an alkyl group having 1 to 4 carbon atoms, $R^3$ is hydrogen or a substituent wherein an atom adjacent to nitrogen shown in the formula (I) has no unsaturated bond, $R^4$ and $R^5$ are arbitrary substituents, provided that only one partial chemical structure of HX—C—C—$NHR^3$ wherein X and $R^3$ are the same as defined above or HX—C—C—C—$NHR^3$ wherein X and $R^3$ are the same as defined above is contained in one compound, or the formula (II):

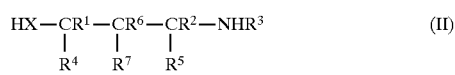
(II)

wherein X is —S— or —O—, $R^1$ $R^2$ and $R^6$ are the same or different, each of which is hydrogen or an alkyl group having 1 to 4 carbon atoms, $R^3$ is hydrogen or a substituent wherein an atom adjacent to nitrogen shown in the formula (II) has no unsaturated bond, $R^4$, $R^5$ and $R^7$ are arbitrary substituents, provided that only one partial chemical structure of HX—C—C—$NHR^3$ wherein X and $R^3$ are the same as defined above or HX—C—C—C—$NHR^3$ wherein X and $R^3$ are the same as defined above is contained in one compound and wherein the compound (I) or(II) is immobilized onto the carrier to form a cyclic structure given, respectively, by formula (III):

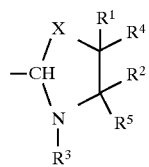 (III)

or formula (IV):

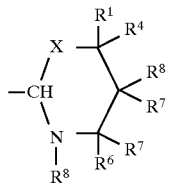 (IV)

2. The method of claim 1 wherein a reaction for immobilization uses conditions satisfying the following:

$0 < b/a \leq 100$ and $1/1000 \leq A \leq 10000$, when $A$ ($\mu$ mol/g) is the density of aldehyde groups of said solvent-insoluble carrier, a($\mu$ mol) is the amount of aldehyde groups in an immobilizing reaction system, and b($\mu$ mol) is the amount of the compound shown by the formula (I) or (II) in the system.

3. The method of claim 1 wherein a solvent-insoluble carrier used as said solvent-insoluble carrier is obtained by introducing an epoxy group into a solvent-insoluble carrier which has no aldehyde group, ring-opening said epoxy group with ammonia or an amine, and then forming an aldehyde group therefrom through an oxidative reaction.

4. The method of claim 1 wherein, after immobilizing said compound onto said carrier, treatment is performed under conditions satisfying the following:

$t \geq -10 \times h + 120$ ($250 \geq t \geq 20$), when t(°C) is the treatment temperature and h(hour) is the treatment time.

* * * * *